United States Patent
Bardon et al.

[11] Patent Number: 5,903,271
[45] Date of Patent: May 11, 1999

[54] FACILITATING VIEWER INTERACTION WITH THREE-DIMENSIONAL OBJECTS AND TWO-DIMENSIONAL IMAGES IN VIRTUAL THREE-DIMENSIONAL WORKSPACE BY DRAG AND DROP TECHNIQUE

[75] Inventors: Didier Daniel Claude Bardon, Austin; Richard Edmond Berry; Scott Harlan Isensee, both of Georgetown, all of Tex.; David John Roberts, Stockton, United Kingdom; John Martin Mullaly, Austin, Tex.

[73] Assignee: International Business Machines Corporation, Armonk, N.Y.

[21] Appl. No.: 08/862,661

[22] Filed: May 23, 1997

[51] Int. Cl.⁶ .................................................... F41G 5/00
[52] U.S. Cl. ........................................ 345/419; 345/474
[58] Field of Search ................................. 345/418, 419, 345/420, 430, 348, 474

[56] References Cited

U.S. PATENT DOCUMENTS

| | | | |
|---|---|---|---|
| 4,127,849 | 11/1978 | Okor | 340/324 |
| 4,987,527 | 1/1991 | Hamada et al. | 364/167.01 |
| 5,305,429 | 4/1994 | Sato et al. | 395/119 |
| 5,369,735 | 11/1994 | Thier et al. | 395/123 |
| 5,475,617 | 12/1995 | Castonguay | 364/525 |
| 5,499,040 | 3/1996 | McLaughlin et al. | 345/146 |
| 5,630,080 | 5/1997 | Malamud et al. | 345/348 |
| 5,721,692 | 2/1998 | Nagaya et al. | 345/474 |

*Primary Examiner*—Phu K. Nguyen
*Assistant Examiner*—Cliff N. Vo
*Attorney, Agent, or Firm*—Paul Kraft

[57] ABSTRACT

A system, method and computer program for a virtual three-dimensional workspace wherein certain three-dimensional objects represent or serve as proxies for a variety of user interactive application programs. Such objects may be selected or triggered by the user to bring forth planar two-dimensional interactive user interfaces having images resembling those of their respective representative 3D objects so that a user may intuitively note the resemblance and select the appropriate object to result in the planar two-dimensional interactive interface appearing in front of the three-dimensional workspace. This two-dimensional planar interface remains active and unaffected by changes to its representative three-dimensional object during the course of navigation or otherwise. A drag and drop technique facilitates viewer interaction between images in a two-dimensional workplane with three-dimensional objects in the virtual three-dimensional workspace.

24 Claims, 6 Drawing Sheets

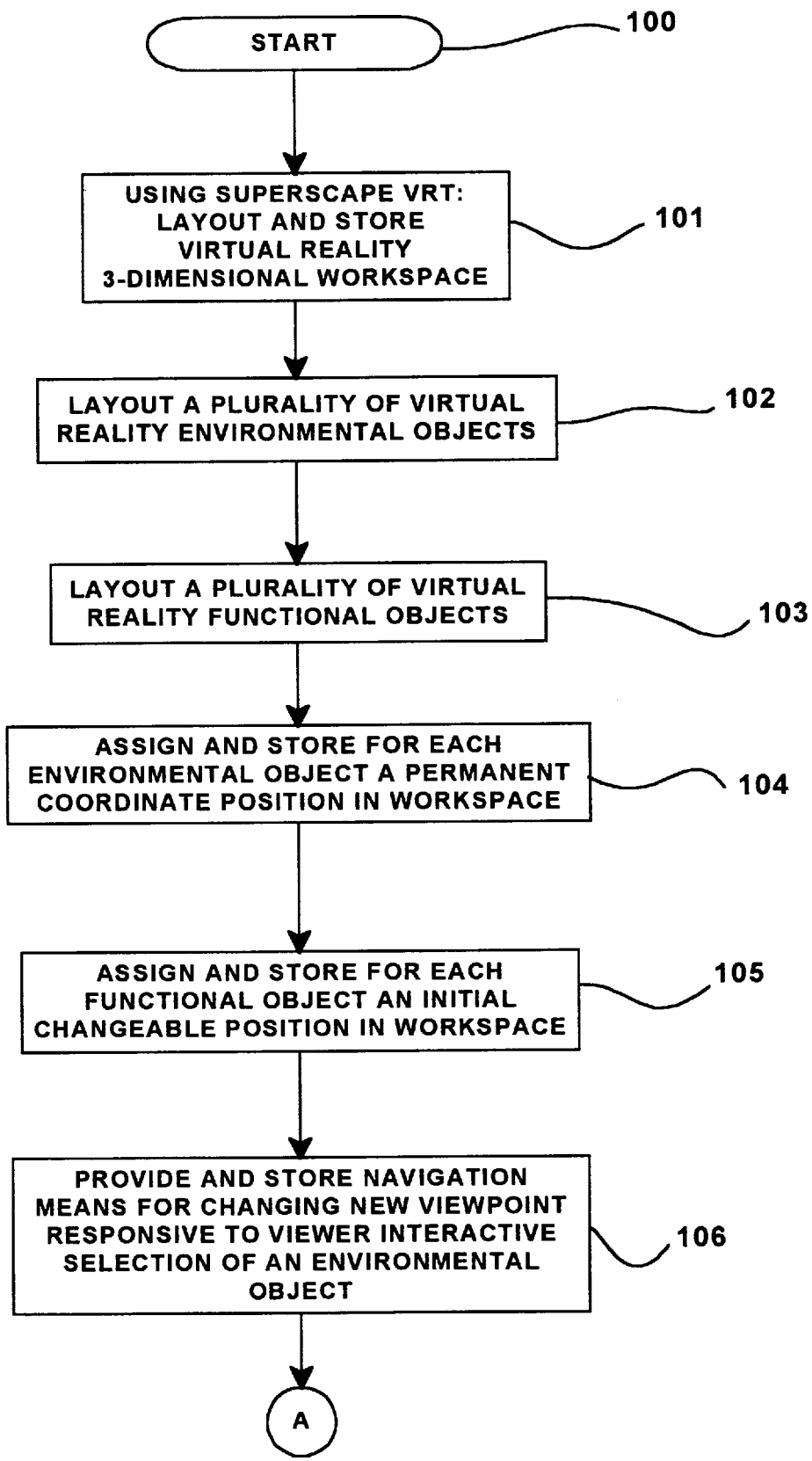

FACILITATING VIEWER INTERACTION WITH THREE-DIMENSIONAL OBJECTS AND TWO-DIMENSIONAL IMAGES IN VIRTUAL THREE-DIMENSIONAL WORKSPACE BY DRAG AND DROP TECHNIQUE

TECHNICAL FIELD

The present invention relates to user interactive computer supported display technology and particularly to such user interactive systems and methods which are user friendly, i.e. provide even noncomputer literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/753,081, entitled "CREATING REAL WORLD OBJECTS" and Ser. No. 08/753,076, entitled "SYSTEM AND METHOD FOR MAINTAINING SIZE AND POSITION RELATIONSHIPS FOR NONRECTANGULAR REAL WORLD OBJECTS", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

A more recent copending application assigned to the Assignee of the present invention is entitled, "VIEWER INTERACTIVE OBJECT IN VIRTUAL THREE-DIMENSIONAL WORKSPACE", D. Bardon et al. (Attorney Docket No. AT9-96-310), which covers face views of virtual three-dimensional objects which may be triggered to appear on a display by interactive viewer input.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations.

In these virtual reality 3D environments as in the real world, the viewer or user is relating to the virtual objects in order to carry out a wide variety of tasks, some of which are quite simple and some very complex. In order for the user to stay focused and carry out his tasks as expeditiously as possible, it would be optimum for the virtual 3D system to provide simpler user interfaces for simple tasks and more comprehensive user interfaces for more complex tasks.

Thus, when the viewer's task is a simple one such as getting more information about a current movie film or about a newly released music CD, the user may be presented with his information in an interface as simple as a face view of a virtual 3D object which contains the information. For example, in the virtual 3D world or workspace, the viewer may navigate to a virtual three-dimensional object of a theater and get his desired movie film information from a face view of the object which presents a marquee of the theater. Similarly, the viewer seeking CD information might navigate to and be presented with a face view of a virtual CD vending kiosk which presents him with his desired information. The above-mentioned patent application, "VIEWER INTERACTIVE OBJECT IN VIRTUAL THREE-DIMENSIONAL WORKSPACE", D. B. Bardon et al., describes such face views of 3D virtual objects. With such simple tasks, the viewer notes his desired information, perhaps makes some simple choices and moves on with his navigation through the virtual 3D workspace.

On the other hand, the navigating viewer's task may be a more complex one like tracking and updating product sales information of a business or group of businesses or within a report or filing a tax statement.

The present invention permits the viewer or user to utilize the more functionally rich two-dimensional interfaces within his three-dimensional virtual reality workspace in more interactive ways simultaneously with his continued navigation through his three-dimensional workspace.

SUMMARY OF THE INVENTION

Before setting forth the present invention, we should establish some basic characteristics of the virtual three-dimensional environment as described in the above-referenced patents and applications. It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused.

As set forth above, it is easier to stay focused when the task for which he is accessing the object is a simple one. The present invention deals with helping viewers to stay focused in more complex tasks.

The present invention operates within the previously described data processor controlled display system for displaying a virtual three-dimensional workspace having three-dimensional objects which are interactively functional, i.e. may be picked by the viewer or user for various computer interactive functions.

The present invention has associated with and stored for each of a plurality of such functional virtual objects, at least one planar two-dimensional image of the virtual object, i.e. the two-dimensional image has sufficient visual similarity to the object which it represents that the viewer or user will intuitively connect the two as he addresses the three-dimensional workspace. The system provides user interactive means so that the user can select one of the virtual objects and means responsive to such a user selection for displaying the two-dimensional planar image associated with the selected object.

The system further provides user interactive means to this planar two-dimensional image so that the user may carry out conventional computer functions such as spreadsheets or word processing within this two-dimensional image. In accordance with an aspect of the present invention, this planar two-dimensional image may be user interactive interfaced to a variety of standard computer applications such as word processing, spreadsheets or image processing.

It should be noted that this interactive two-dimensional image remains permanently associated with the three-dimensional object which it represents. The 2-D and 3-D views are properties of the software object (i.e. speed dialing). Both the 2-D and 3-D views are stored in the software and represent the same object. Since the properties of the object are independent of the views, 2D or 3-D, if one changes the properties of an object in any view, 2-D or 3-D, it will automatically upgrade these same properties in all the views.

In the manner described above, once interactive planar two-dimensional image is opened, the user may retain it as an active access to the computer function being carried out interactively within the image, e.g. an application program even when the user is also navigating through the virtual three-dimensional workspace and is proceeding to or relating to a subsequent three-dimensional object other than the three-dimensional object associated with the selected two-dimensional image.

In order to understand the present invention, it is important its advantages over conventional two-dimensional systems be considered. In such two-dimensional systems, the potential functions and applications of the display systems are represented by an array of icons which the user may respectively select in order to bring forth particular computer functional application interface on the display. Other than representing a particular computer function or program, these conventional two-dimensional icons of the prior art do not act in combination with other elements as do the three-dimensional object of the present invention to provide interrelated three-dimensional environment through which the viewer may navigate. Such a three-dimensional virtual workspace environment permits even the most complex of computer setups to be intuitively organized with respect to the viewer so that the viewer may navigate and make appropriate selections and combinations of selections.

In accordance with a more particular aspect of the present invention, because of the object oriented programming environment which is used to implement the present invention, the virtual three-dimensional object and its associated planar two-dimensional functional image are stored in the computer and treated as an entity.

It should be further noted that the interactive two-dimensional image remains permanently associated with the three-dimensional object which it represents. The 2-D and 3-D views are properties of the software object (i.e. speed dialing). Both the 2-D and 3-D views are stored in the software and represent the same object. Since the properties of the object are independent of the views, 2-D or 3-D, if one changes the properties of an object in any view, 2-D or 3-D, it will automatically upgrade these same properties in all the views. Thus the 2-D and 3-D views are merely two versions of the same object.

A major embodiment of the present invention relates to a system and method for assisting interactive users to effectively operates between the two-dimensional images and the three-dimensional objects, or vice-versa, during the execution of a task. For example this might involve the transfer of data back and forth between these two configurations. This objective is effectively accomplished by applying the "drag-and-drop" direct manipulation technique to the interaction context. The novelty of this approach is that it allows the user to "drag-and-drop" data between the two-dimensional (2d) images and the three-dimensional (3d) object. As an example we can consider the situation where in the 2d image we have displayed a "ROLODEX" card file and in the 3d view workspace we have a telephone object displayed. To initiate a call, the user would simply look up the desired telephone number card in the "ROLODEX" 2d view and key it into the telephone 3d view. This is very rapidly accomplished by the drag and drop technique between the 2d image display and the 3d telephone object. Merely by clicking and dragging on a business card in the "ROLODEX"2d view the user will pick up the business card object that contains the desired phone number to be called; in the form of a "mini" representation of the business card. This mini representation of the business card is then attached to the pointer as visual feedback. The user can then drag the business card representation on the screen until it overlaps the 3d view of the telephone object. They can then drop the business card on to the 3d telephone by simply releasing the mouse button. The system will transfer the data, which in this example is a phone number, from the "ROLODEX" 2d image, to the telephone object in the 3d workspace view, which then interacts with the 3d telephone in the workspace to subsequently initiate the telephone call.

BRIEF DESCRIPTION OF THE DRAWINGS

FIG. 5A is the initial flowchart of the process implemented by the present invention, for initiating an interaction between an image in the two-dimensional (2d) workplane with that of an object in the three-dimensional (3d) virtual reality workspace, resulting in the initiation of an action or change in the 3d environment.

DETAILED DESCRIPTION OF THE PREFERRED EMBODIMENT

Figure 1:
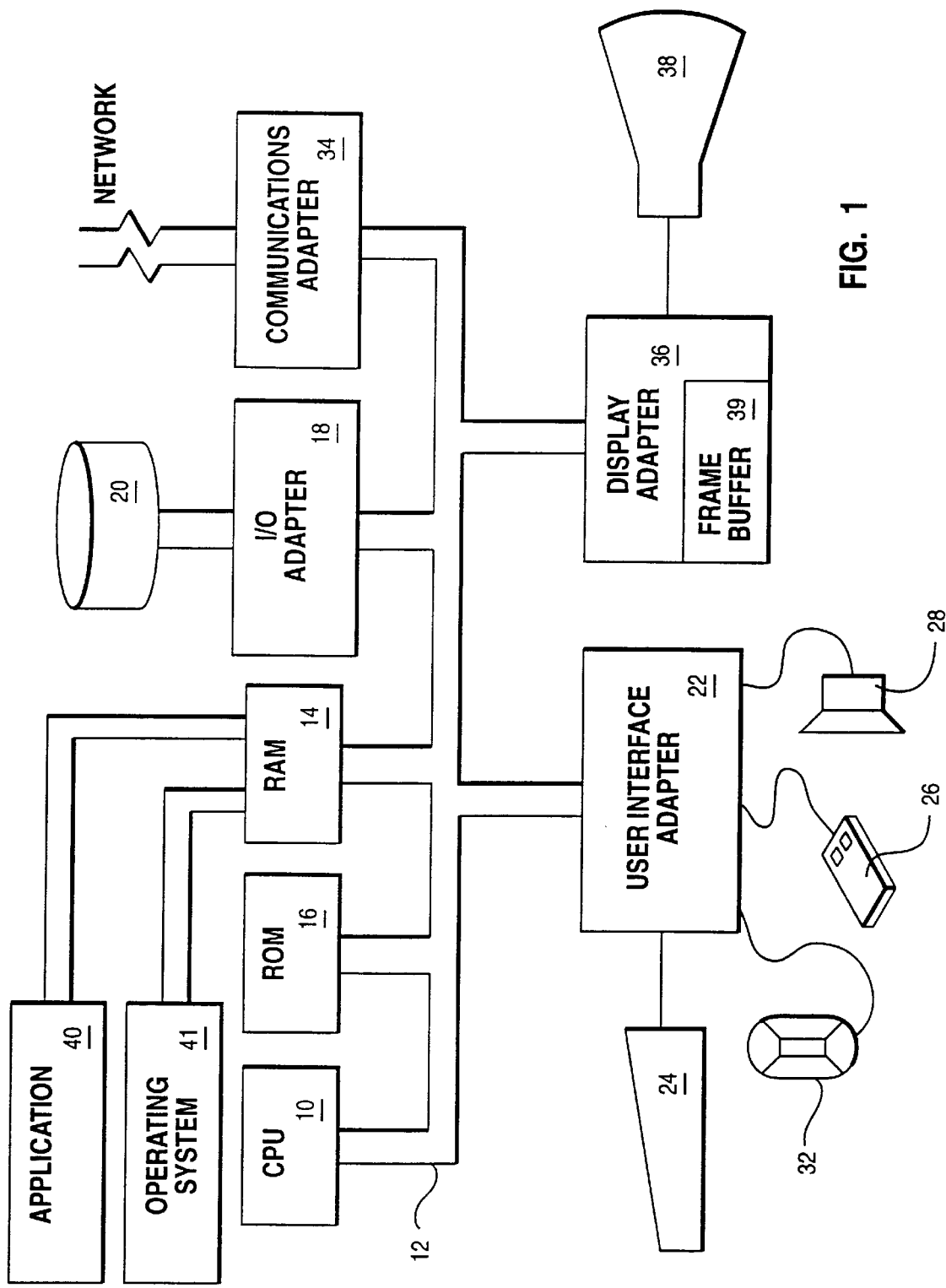
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The description of the present invention often refers to navigation within the three-dimensional virtual workspace. The workspace or landscape is navigable using conventional three-dimensional navigation techniques. A user may move around or navigate within the three-dimensional data representation to alter his perspective and view of the displayed representation of the data. Thus, a user may be referred to as a navigator. Although the navigator or viewer stays stationary (i.e. in his chair), the coordination of his point of view varies as he navigates around the visual world. The user indicates where he wants to look and the system transmits the virtual point of view. Thus we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The three-dimensional objects which will be subsequently described in embodiments of the present invention may be best implemented using object oriented programming techniques, such as the object oriented techniques described in the above-mentioned copending application Ser. No. 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it useful to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such pre-defined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing.

Therefore, those skilled in the art will understand how the present invention is implemented using object oriented programming techniques as described above.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation application program 40 such as the previously described VRT of Superscape in the RAM 14 of the system of FIG. 1. Also stored on the RAM will be a suitable operating system 41 such as DOS or Windows.

An embodiment of the present invention will now be described with respect to the virtual reality workspace shown in FIGS. 2,3 4 and 5a and 5b. The workspace 42 is shown as an office environment with a desk 43, as well as a telephone answering machine 44. On the desk 43 is a telephone answering machine 44a, a desk blotter 44b, a telephone 44c and a "Rolodex" card file 44d. The workspace 42 is centered within a viewpoint interface which is presented to the viewer on display monitor 38 of FIG. 1.

Figure 2:
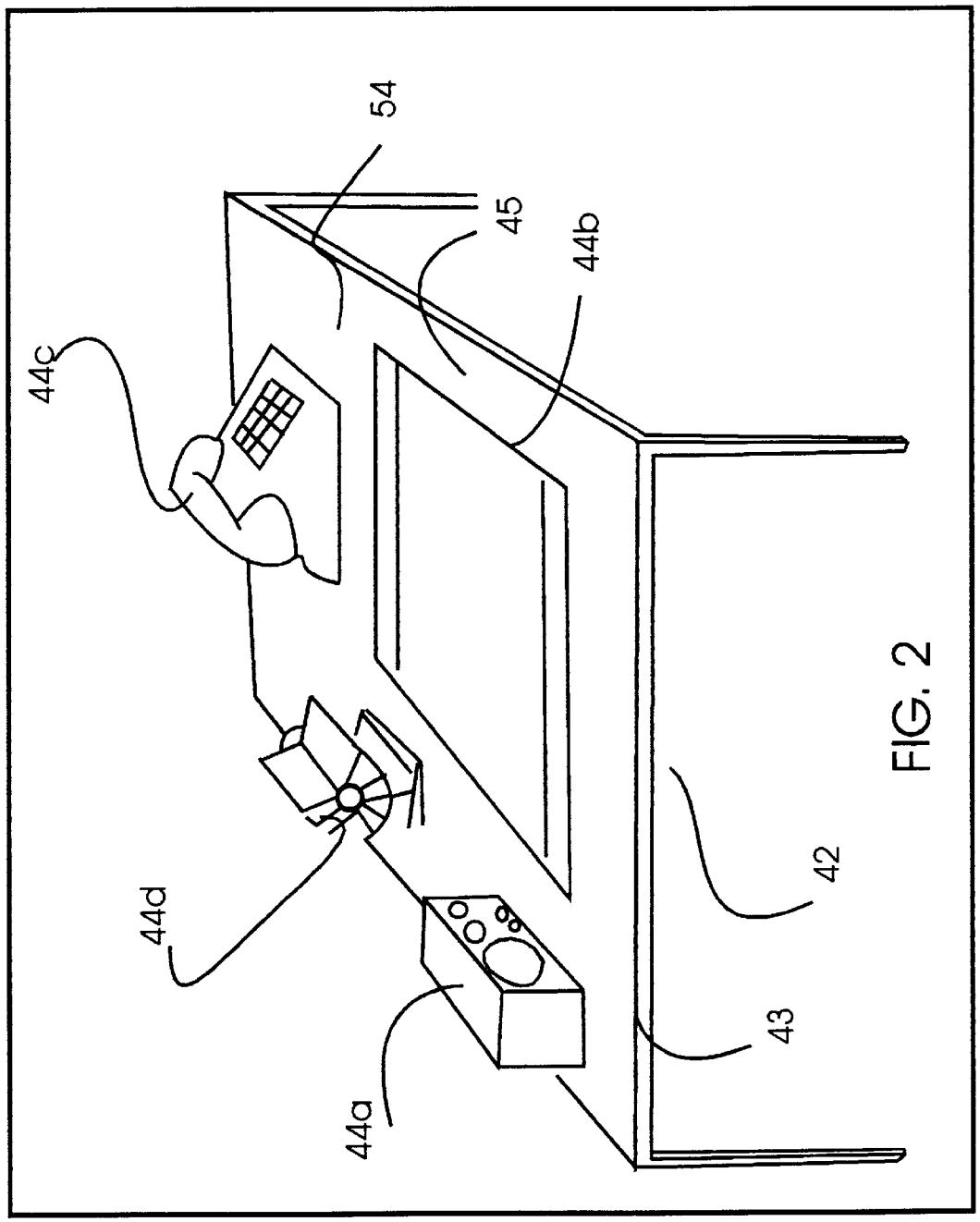
FIG. 2 shows a typical 3d virtual reality workplace in accordance with the present invention at an initial viewpoint which includes functional objects such as a desk pad, telephone, a "Rolodex" business card file, a telephone and a telephone answering machine.

First, step 42 FIG. FIG. 2 the virtual reality three-dimensional workspace, for example workspace 42, FIG. 2, is created and stored. Next, step, the virtual reality 3D objects are created and stored. These would include the object oriented code representation of such objects as "Rolodex 44d, telephone answering machine 44a and the telephone 44c in FIG. 2. Next, step several user interactive computer programs are stored on the system of FIG. 1. These would be stored in suitable storage means accessible to RAM 14 of FIG. 1 wherein the application programs would be loaded when activated. Next, step, the programmer will design or create for each application program stored in the computer a two-dimensional planar user interactive interface with an image resembling one of the 3D objects which is to represent or be the proxy for the respective program. By resembling we mean that the two-dimensional image must be such that the user of the system will intuitively understand that the three-dimensional object chosen to represent or stand as the proxy for the two-dimensional planar interface to the application program will have sufficient likeness to the program and its two-dimensional interface that the user can make the connection between the two intellectually when confronted with the need to activate the application program. Then, step 54, each two-dimensional interactive interface is stored associated with the three-dimensional object which represents it or is a proxy for it. In this connection, it should be noted that with the recent advance of object oriented programming techniques, such as those described above and including such object oriented techniques as OpenGL or the above-described VRT, it is possible to create software capsules or entities which not only define the object itself but associated the object with an interactive planar two-dimensional image interface such as "Rolodex 44d in FIGS. 3 or 4. In this manner, the two-dimensional interactive planar image interface such as "Rolodex 44d is permanently associated with the particular three-dimensional object which in the present case is "Rolodex 44d or FIG. 2, so that even if the position of the object 44d is subsequently changed in the workspace or the size of object 44d is changed during navigation, the two-dimensional interactive image 49 will remain permanently associated with the "Rolodex 44d. Then, step 55, a conventional means is provided for navigating through the virtual reality workspace 42 in FIGS. 2 through 5, using for example the navigation technique of changing the viewpoint.

In accordance with conventional techniques, the user may control the viewpoint 45 through a conventional I/O device such as mouse 26 or FIG. 1 which operates through the user interface 22 of FIG. 1 to call upon VRT programs in RAM 14 operating with the operating system 41 to create the images in frame buffer 39 of display adapter 36 to control the display on monitor 38. Using conventional virtual three-dimensional workspace navigation techniques, the viewpoint interface 45 of FIG. 2 is changeable as the viewer moves closer or backs away from objects in the workspace or moves to right or to the left in the workspace. All this may be controlled by a suitable I/O device such as mouse 26 of FIG. 1. The previously mentioned devices within workspace 42 are functional three-dimensional objects such as "Rolodex"44d, telephone answering equipment 44a or telephone 44c. The images for these various objects are stored as data from which the objects may be created on the display in RAM 14 of FIG. 1 in connection with the VRT program.

Figure 3:
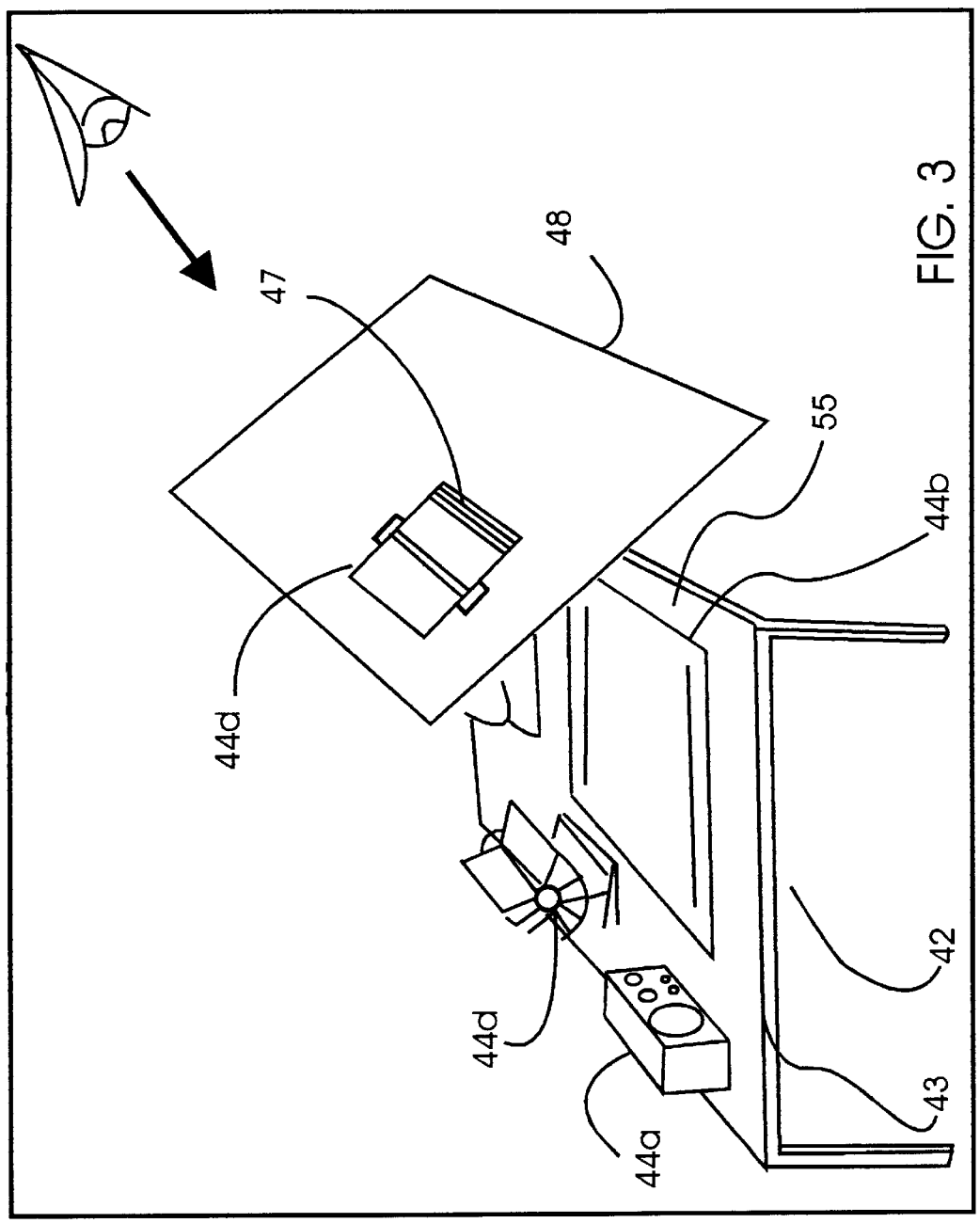
FIG. 3 is a representation of an initial workplane two-dimensional (2d) image interface set up in front of the three-dimensional workspace of FIG. 2. The planar 2d workplane contains an image of the "Rolodex" business card file.

Let us assume that a user or viewer is navigating through a three-dimensional workspace in which the viewpoint 45 of FIG. 2 is a desktop. When he reaches the viewpoint 45 in FIG. 2 the viewer has need to access some business card phone number for a phone call, which is stored and represented by "Rolodex" object 44d. The system provides for the viewer selection of any one of the objects through some appropriate pointing device such as mouse 26 in FIG. 1. When the viewer clicks onto "Rolodex" 44d using the mouse 26 in FIG. 1, the result is, as shown in FIG. 3: a planar two-dimensional workplane image 48. As shown in FIG. 3 the "Rolodex" appears on the display screen in front of the three-dimensional workspace 42 as shown in viewpoint 45. The image 47 FIG. 3 of the "Rolodex" is interactive, i.e. the viewer by suitable means such as clicking with mouse 26 in FIG. 1 may turn the business cards in the "rolodex" and select the business card 49 FIG. 3 with the appropriate phone number, contained therein.

Figure 4:
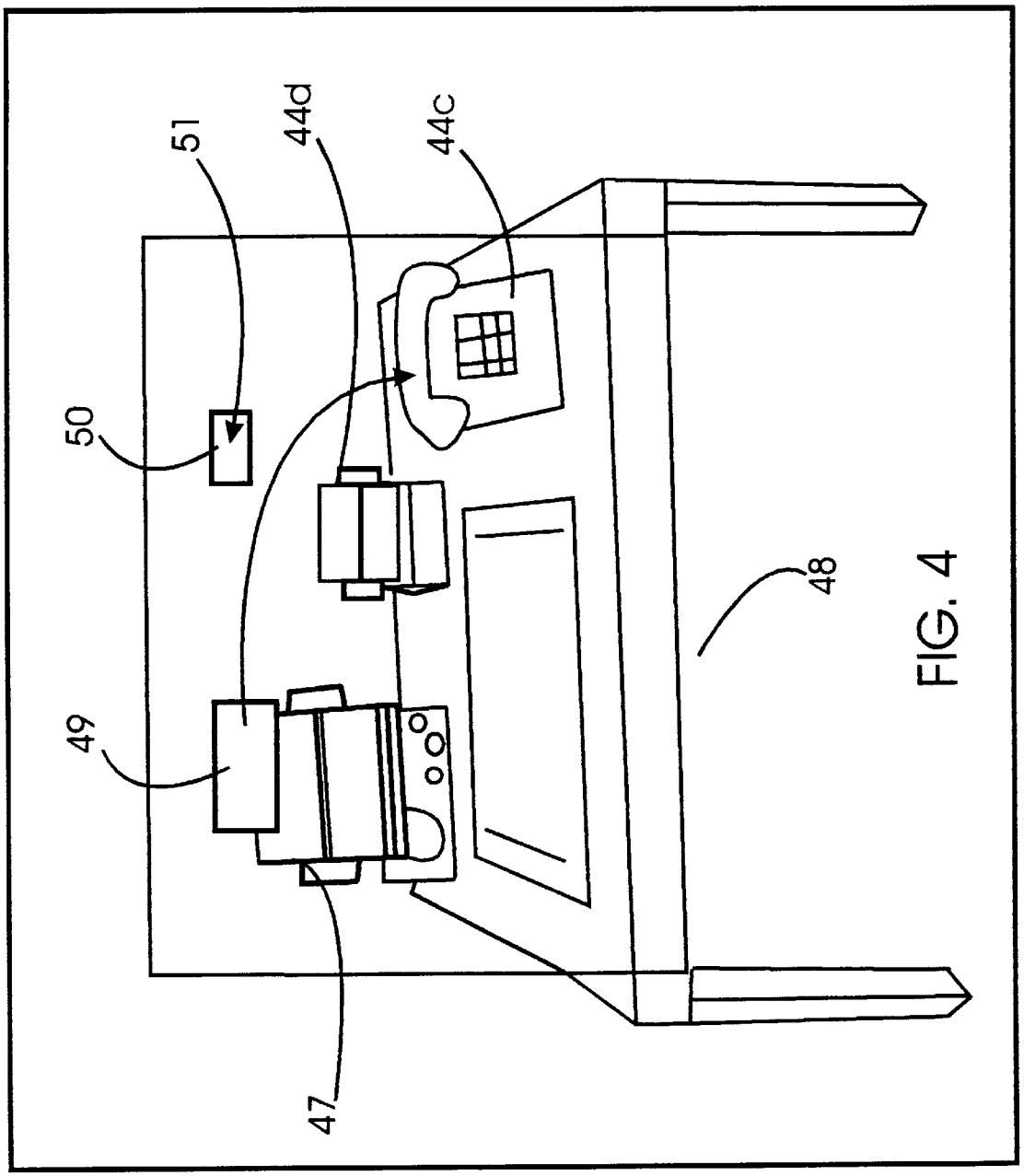
FIG. 4 represents the "drag & drop" technique as applied to the typical image, a "ROLODEX" business card. A miniature of any desired business card image, is picked up at the end of the pointer and dragged from the two-dimensional workplane to the three-dimensional workspace containing the 3d virtual reality telephone object. The miniature business card image from the 2d workspace is then "dropped" on the telephone interacting with it and initiating the call to the number on the business card.

With reference to FIG. 4, the two-dimensional "Rolodex" image 47, appears on the two dimensional screen in front of viewpoint 45 of FIG. 3. A specific business card 49 is shown. It is selected after several business cards have been interactively turned to a particular business card in the "Rolodex" hierarchy of business cards.

A key to the present invention is that the viewer may interactively relate the two-dimensional image plane such as for example the "Rolodex" 47, FIG. 4, while the three-dimensional world behind the object remains active and navigatable.

The specific embodiment of the present invention relates to a method of assisting interactive users to effectively move between the two-dimensional images in FIGS. 4 and FIG. 2 and the three-dimensional objects in the workspace 42, or vice-versa, during the execution of a task. For example this might involve the transfer data back and forth between these two configurations, i.e. from the 2d workplane to the 3d workspace or in the reverse direction from the 3d workspace to the 2d workplane. This novel objective is effectively accomplished by applying the "drag-and-drop" direct manipulation technique to for example, the interaction of the "Rolodex" business card 49 of FIG. 4. with the telephone FIG. 3 44c in the three-dimensional view. The novelty of this approach is that it allows the user to "drag-and-drop" data between the two-dimensional (2d) image 49, the business card, for example FIG. 4 to the three-dimensional (3d) telephone object 44c in the three-dimensional environment of FIG. 3. As a continued example, we can consider the situation where in the 2d "ROLODEX" card 50 in FIG. 4 can be used to initiate a call via the 3d telephone 44c in FIG. 4 The user would simply have the desired telephone number containing business card 50 in the "ROLODEX" 2d 49 FIG. 4 viewed and then key it into the telephone 44c FIG. 4 three-dimensional view. This is easily accomplished by the "drag-and-drop" technique between the 2d image display of the "Rolodex" business card 49 and the 3d telephone object 44c. Merely by clicking and dragging on a business card 49 in the "ROLODEX"2d view, the user will pick up the business card object,(i.e as a mini card version) that contains the desired phone number to be called. The system informs the viewer that the business card 50 is indeed picked up by drawing a mini representation of the business card on the pointer, a visual feedback technique called pointer augmentation. This mini representation of the business card,is attached to the pointer device 51 such as a cursor or other indicator visible on the screen and controlled by the mouse, 32 from FIG. 1, for visual feedback. The user drags the business card representation on the screen until it overlaps the 3d view of the telephone object 44c. The user can then "drop" the business card 50 on to the 3d telephone 44c by simply releasing the mouse button 32 from FIG. 1. The system will transfer the data, which in this example is a phone number, from the "ROLODEX" 2d image 47 FIG. 4, to the telephone object 44c FIG. 4, in the 3d view which then interacts with the telephone object 44c, to subsequently initiate the telephone call using the phone number on the business card 50.

Figure 5B:
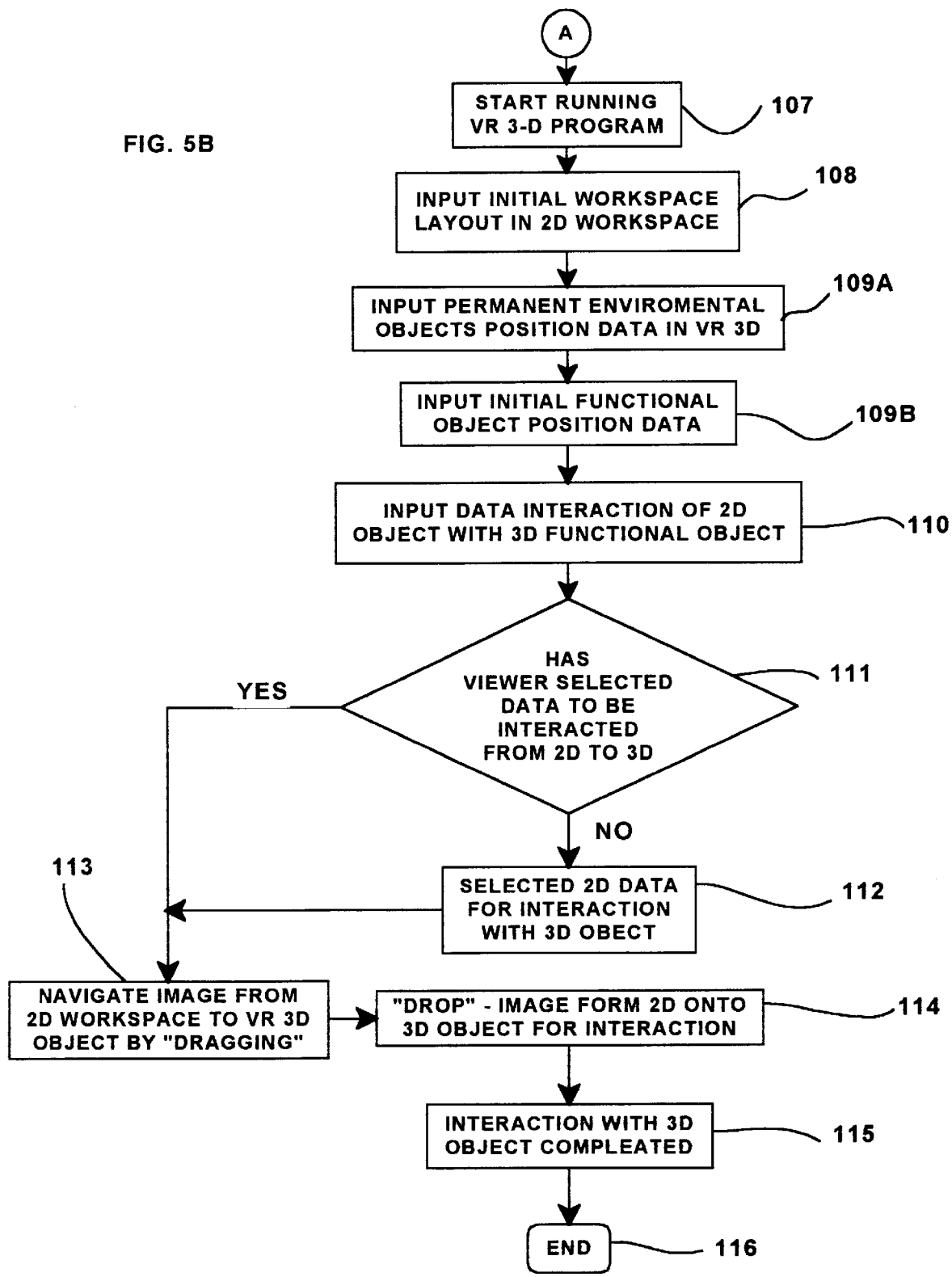
FIG. 5B is a continuation flowchart of FIG. 5A in which the process completes the action or changes on the object in the 3d environment.

Now with reference to flowcharts FIGS. 5a and 5b, we will describe a process implemented by the present invention. These flowcharts are in two parts: the steps in FIG. 5a relate to the development of the virtual reality environmental objects, the application programs with which particular objects are associated, as well as the two-dimensional interactive user interfaces provided for such application programs. The developments are made in accordance with the present invention using the previously described Superscape VRT object oriented programming toolkit.

The specific embodiment of this inventive entity is illustrated with reference to flowcharts FIGS. 5a and 5b. In order to initiate a specific telephone call in the three-dimensional workspace shown in FIG. 4b. The process is initiated by the viewer, using conventional navigation means as described above. The process is started using the Superscape VRT layout and store virtual reality 3 dimensional workspace 101 of FIG. 5a. This is then followed by a laying out of a plurality of virtual reality functional objects 102, such as in the present case the desk 43 and the desk pad 44b in FIG. 2. The process then continues by laying out a plurality of virtual reality functional objects 103, such as the answering machine, 44a, the "Rolodex" 44d and the telephone 44c, in FIG. 2. Each of environmental objects,i.e. desk pad 44b and the desk 43 is then assigned and stored in a permanent coordinate position in the workspace 104 and subsequently each functional object 105, FIG. 5a, such as the answering machine, 44a, the "Rolodex" 44d and the telephone 44c, in FIG. 2 are assigned and stored in an initial changeable portion in the workspace. There then is subsequently provided and stored, the navigation means for changing new view points which are responsive to the viewer's interactive selection of environmental objects 105, FIG. 5a. The process then provides for and stores the navigation means for changing new view points responsive to the viewer's interactive selection of an environmental objective 106.

The next step in the process of the current invention is the use the drag-and-drop technique to facilitate image interaction between the 3d dimensional objects and 2d dimensional images in virtual 3d workspace. This involves the start the running VR 3d program 107, FIG. 5b. This is followed by inputting initial work space layout in the 2-d workspace 108. Then the input of permanent environmental objects, position data 109a and similarly input initial functional object position data 109b. The process then involves the input of data for interaction of a 2d image in the 2d workspace with a 3d functional object. The question is then raised as to whether the viewer has selected the data to be interacted from the 2d workspace with the functional object in the 3d VR workspace 111 FIG. 5b. If yes then the data is navigated from the 2d workspace to the 3d VR object(i.e. Business Card) by "dragging" technique 113. The data (i.e. Business Card) is then "dropped" on the functional object in the 3d environment 114. If the answer to the question raised in 111 is no, then the viewer must select the data from image in workspace in 2d to be navigated to in 3d workspace and proceed to 113. Moving from 113, the data is then moved by some sort of pointer device such as a mouse, to the 3d workspace functional object and dropped on the functional 3d object for interaction 114. The interaction subsequently takes place between the data from the 2d workspace and that of the 3d functional object to complete the task 115. While we have illustrated the present invention with a two-dimensional planar user interface wherein the user may retrieve information interactively from a "Rolodex", it will be understood that user interactive image could have been any two-dimensional interface to an application program for which the three-dimensional object serves as a proxy in the three-dimensional workspace. The interface could have been one representing a statistical program in which case interface image would have been that of a spreadsheet. Interface image could have also been a planar two-dimensional image providing access to a CAD/CAM applications program.

Although certain preferred embodiments have been shown and described, it will be understood that many changes and modifications may be made therein without departing from the scope and intent of the appended claims.

We claim:

1. A data processor controlled display system for displaying a virtual three-dimensional workspace comprising:

means for displaying a plurality of user interactive virtual three-dimensional objects in said workspace;

means for displaying a two-dimensional workplane within said three-dimensional workspace;

means for displaying a plurality of user interactive two-dimensional images in said workplane;

means for user-interactive selection of one of said two-dimensional images and for moving at least a portion of said selected images to one of said three-dimensional objects, and means responsive to said movement for initiating a user-interactive function.

2. The processor controlled display system of claim 1 further including:

means for user interactive selection of one of said three-dimensional objects and moving at least a portion of said selected object to one of said two-dimensional images, and means responsive to said movement for utilizing a user-interactive function.

3. The processor controlled display system of claim 1 where said means for user-interactive selection of one of said two-dimensional images and for moving at least a portion of said selected objects to one of said three-dimensional images, occurs by means of the Drag-and-Drop technique, for initiating said user-interactive function.

4. The processor controlled display system of claim 2 where said means for user-interactive selection of one of said three-dimensional objects and moving at least a portion of said selected object to one of said two-dimensional images, occurs by means of said "Drag-and-Drop" technique, for initiating said user-interactive function.

5. The processor controlled display system of claim 1 further including means for changing a displayed three-dimensional object without changing the corresponding two-dimensional image of said changed object.

6. The processor controlled display system of claim 5 wherein said means for changing said three-dimensional object change the size of said object.

7. The processor controlled display system of claim 1 further including:

viewer interface means for navigating within said three-dimensional workspace; and said means for user input to said two-dimensional image remains active after the user has navigated away from said selected virtual object.

8. A data processor implemented method for displaying a virtual three-dimensional workspace comprising:

displaying a plurality of virtual three-dimensional objects in an environmentally associated with said virtual workspace;

displaying a two-dimensional workplace within said three-dimensional workspace;

displaying a plurality of user interactive two-dimensional images in said workplane;

providing for user-interactive selection of one of said two-dimensional images and for moving at least a portion of said selected images to one of said three-dimensional objects, and providing a means responsive to said movement for initiating a user-interactive function.

9. The display method of claim 8, further, providing for user-interactive selection of one of said three-dimensional object and for moving at least a portion of said selected object to one of said two-dimensional images and providing a means responsive to said movement for initiating a user-interactive function.

10. The display method of claim 8 wherein the user-interactive selection of one of said two-dimensional images and moving at least a portion of said selected image to one of said three-dimensional objects, occurs by means of the Drag-and-Drop technique, for initiating a user-interactive function.

11. The display method of claim 8 wherein the user-interactive selection of one of said three-dimensional object and moving at least a portion of said selected object to one of said two-dimensional images, occurs by means of the Drag-and-Drop technique, for initiating a user-interactive function.

12. The display method of claim 8 further including means for changing a displayed three-dimensional object without changing the corresponding two-dimensional image of said changed object.

13. The display method of claim 8 further including the step of the user interactively providing input to said displayed two-dimensional image.

14. The method of claim 8 further including the step of changing a displayed three-dimensional object without changing the corresponding two-dimensional image of said changed object.

15. The method of claim 8 wherein said three-dimensional object and its two-dimensional image are displayed simultaneously.

16. The method of claim 8 wherein said step of changing said three-dimensional object changes the size of said object.

17. The method of claim 8 wherein said step of changing said three-dimensional object changes the position of said object in said workspace.

18. The method of claim 8 wherein said two-dimensional image provides the interactive user interface to an application program stored in said data processor.

19. The method of claim 8 further including the steps of navigating the user view within said three-dimensional workspace away from the selected virtual object while maintaining the user interactive input to said two-dimensional image.

20. A computer readable program having data structures included on a computer readable medium which causes the display on a data processor controlled display of a virtual three-dimensional workspace comprising:

means for displaying a plurality of user interactive virtual three-dimensional objects in said workspace;

means for displaying a two-dimensional workplace within said three-dimensional workspace;

means for displaying a plurality of user interactive two-dimensional images in said workplane;

means for user-interactive selection of one of said two-dimensional images and for moving at least a portion of said selected objects to one of said three-dimensional images, and means responsive to said movement for initiating a user-interactive function.

21. A computer readable program of claim 20 further including:

means for user interactive selection of one of said three-dimensional objects and moving at least a portion of said selected object to one of said two-dimensional images, and means responsive to said movement for utilizing a user-interactive function.

22. A computer readable program of claim 20 where said means for user-interactive selection of one of said two-dimensional images and for moving at least a portion of said selected objects to one of said three-dimensional images, occurs by means of the Drag-and-Drop technique, for initiating said user-interactive function.

23. A computer readable program of claim 20 where said means for user-interactive selection of one of said three-dimensional objects and moving at least a portion of said selected object to one of said two-dimensional images, occurs by means of the Drag-and-Drop technique, for initiating said user-interactive function.

24. The computer program of claim 20 further including user interactive means for user input to said displayed two-dimensional image.

* * * * *

UNITED STATES PATENT AND TRADEMARK OFFICE
CERTIFICATE OF CORRECTION

Page 1 of 1

| | |
|---|---|
| PATENT NO. | : 5,903,271 |
| APPLICATION NO. | : 08/862661 |
| DATED | : May 11, 1999 |
| INVENTOR(S) | : Bardon et al. |

It is certified that error appears in the above-identified patent and that said Letters Patent is hereby corrected as shown below:

In column 13, line 16, claim 8 delete "environmentally" and insert -- environment -- and in column 13, line 18 delete "workplace" and insert -- workplane --

Signed and Sealed this
Twenty-eighth Day of February, 2012

David J. Kappos
*Director of the United States Patent and Trademark Office*